United States Patent
Baba et al.

(10) Patent No.: US 6,701,846 B2
(45) Date of Patent: Mar. 9, 2004

(54) HOLOGRAPHIC STEREOGRAM PRINT ORDER RECEIVING SYSTEM AND A METHOD THEREOF

(75) Inventors: Shigeyuki Baba, Tokyo (JP); Akira Shirakura, Tokyo (JP); Koji Ashizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 09/975,579

(22) Filed: Oct. 11, 2001

(65) Prior Publication Data

US 2002/0069779 A1 Jun. 13, 2002

(30) Foreign Application Priority Data

Oct. 16, 2000 (JP) ...................... P2000-315970

(51) Int. Cl.[7] .............. B41F 1/66; G06F 15/16
(52) U.S. Cl. ...................... 101/484; 358/1.15
(58) Field of Search ................ 101/484, 483; 400/61, 70, 76, 62; 358/1.15; 705/7, 26; 359/15, 23

(56) References Cited

U.S. PATENT DOCUMENTS

| | | | | |
|---|---|---|---|---|
| 4,834,476 A | * | 5/1989 | Benton | 359/23 |
| 5,778,164 A | * | 7/1998 | Watkins et al. | 358/1.18 |
| 6,507,704 B2 | * | 1/2003 | Enomoto | 396/60 |
| 6,515,756 B1 | * | 2/2003 | Mastie et al. | 358/1.15 |
| 2001/0049640 A1 | * | 12/2001 | Kurokawa et al. | 705/26 |
| 2002/0041388 A1 | * | 4/2002 | Aoki | 358/1.14 |
| 2002/0042263 A1 | * | 4/2002 | Ishikawa | 455/412 |
| 2002/0186402 A1 | * | 12/2002 | Jackson et al. | 358/1.15 |

* cited by examiner

Primary Examiner—Andrew H. Hirshfeld
Assistant Examiner—Hoai-An D. Nguyen
(74) Attorney, Agent, or Firm—Jay H. Maioli

(57) ABSTRACT

A holographic stereogram print order receiving system and method wherein an order receiving server which, upon completion of a connection and user inquiry, receives a two-dimensional image and the parameter information indicating a zooming zone from a user terminal and sends this information to an image processing server. Zooming image processing is executed relative to the two-dimensional image using the parameter information such that the zooming image can be observed when viewed by changing its viewpoint. This zooming image processed data is sent to the user terminal as preview image data. Then, the zooming image processed data is sent from the image processing server to the image storing server. A printout device supplied with the zooming image processed data from the image storing server generates a holographic stereogram.

15 Claims, 9 Drawing Sheets

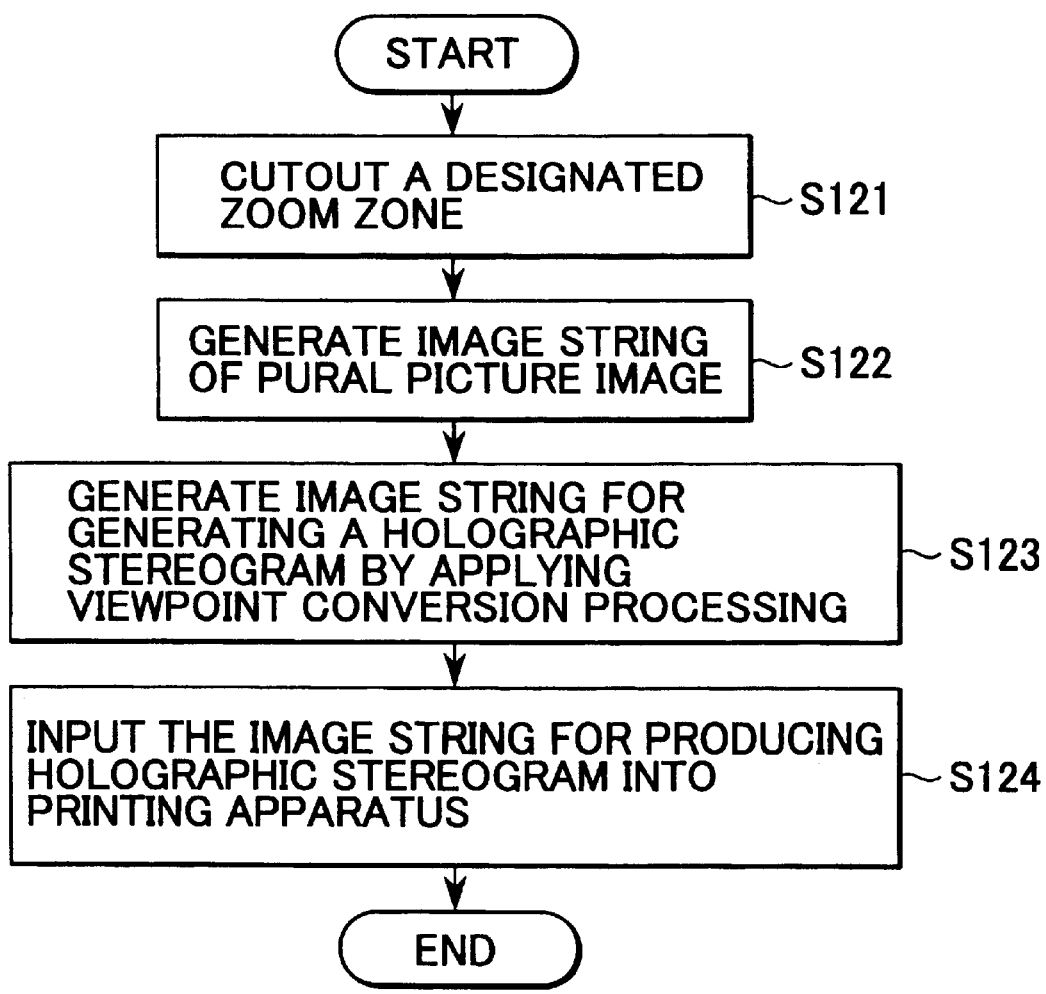

HOLOGRAPHIC STEREOGRAM PRINT ORDER RECEIVING SYSTEM AND A METHOD THEREOF

CROSS REFERENCE TO RELATED APPLICATION

This application claims priority to Japanese Patent Application No. JP 2000-315970, and the disclosure of that application is incorporated herein by reference to the extent permitted by law.

BACKGROUND OF THE INVENTION

1. Field of the Invention

The present invention relates to a holographic stereogram print order receiving system and a method thereof capable of performing services to receive an order for a holographic stereogram and to provide the holographic stereogram as a printed matter.

2. Description of the Related Art

Recently, an image printing system capable of providing services including from imaging of an object to printing of the result of the imaging at the same site becomes widely popular as disclosed in Japanese Utility Model Patent No. 3014733.

Further, such a system that can image and print not only a still picture image but also a motion picture image or a parallax picture image has been developed, therefore, it has become possible to obtain a printed matter, wherein the picture image changes when observed while varying its viewing directions.

As examples of new business operations according to the above, there have been proposed several operations that produce a parallax picture image as a printed matter utilizing the lenticular technology such as follows, for example.

- The triple-eyes-lens equipped film camera called "Torikkiri Konica 3-D (Trade Name)" and its print service provided by Konica Corp.
- The triple-eyes-lens equipped film camera called "Kodak Snap Kids 3-D (Trade Name)" and its print service provided by Kodak Corp.
- The "MIP (Motion Image Print) card (Trade Name)" obtained by synthesizing 6 picture images and the MIP card producing device called "UgoiTaro (Trade Name)" developed by Matsushita Denki Sangyo Ltd.
- The Internet Service provided by Chikyuya K. K. for receiving orders for the cards of the above-mentioned "UgoiTaro (Trade Name)" through the Internet.
- An automatic vending machine for providing motion picture image cards capable of viewing like moving picture image when viewed from different directions by creating from consecutive picture images of an object, and such machine is supplied as a non-consumer amusement equipment on the basis of a customer order sale provided by Matsushita Denki Sangyo Ltd.

As similar systems that employ the holographic technology for producing a printed matter, there have been also proposed printing systems for providing services from imaging pictures of an object to printing of the result of its imaging at the same site, as follows.

"Instant holographic portrait printing system" by Akira Shirakura, Nobuhiro Kihara and Shigeyuki Baba, Proceeding of SPIE, Vol. 3293, from page 246 to page 253, January 1998.

"High-speed hologram portrait print system" by Kihara, Shirakura, Baba, at 3-D Image Conference 1998, July 1998.

For a user who desires to use some of the above-mentioned systems that provide the services from imaging pictures of an object to printing of the result of its imaging on the same site, it has been necessary for the user to visit a place where its system is installed in order to have its pictures taken and obtain a printed matter thereof. Further, it has been difficult with these systems to obtain the same printed matter afterward as the ones obtained previously.

Because of such reasons described above, the user who uses these systems often feels inconvenience, impairing the usefulness and advantages of these systems.

On the other hand, as a business operator who operates any one of such systems, in order to increase an amount of sales, it has been necessary for the business operator to increase the number of equipment to install for this system. Further, if the number of equipment installed increases, there has been such a problem that unless a great number of users are obtained for a unit period of time and a favorable condition of high rate of operation or availability factor of the system is maintained, and accordingly it takes a long time for the business operator to recover a large amount of the investment of the equipment. In particular, because the systems for printing motion picture images or parallax picture images are still in their development stages to practical levels, and because of a very high cost of investment of its equipment, it is very important to eliminate the above-mentioned problem associated with these systems.

For the user, it has been desired to be able to place an order for a holographic stereogram that allows to observe an image in which a designated zone is zoomed by changing its viewpoints, only by simply sending a 2-D (2-Dimensional) picture that the user already has and an instruction designating a zooming zone to a shop operator via a network.

On the other hand, for the shop operator, it has been desired to have a holographic stereogram print order receiving system and a method thereof that can substantially improve the rate of operation or availability factor of the system, and to provide an excellent benefit and conveniences to both the user and the shop operator.

SUMMARY OF THE INVENTION

A hologram print order receiving system of the present invention comprises: a user terminal means; a first network means to which the user terminal means is connected; an order receiving means for receiving a connection request and an order from the user terminal means via the first network means; an image processing means for executing an image processing relative to an image transmitted from the user terminal means via the first network means when the order is authenticated and accepted in the order receiving means; a second network means to be connected to the first network means via the order receiving means and the image processing means; an image storage means for storing processed image data obtained by executing the image processing relative to the image transmitted via the second network means; a charging and settlement transaction means for performing a charging and settlement transaction in accordance with the order from the user terminal means; a printout order receiving means for receiving a printout order according to the order received by the order receiving means via the second network means after completion of the charging and the settlement transaction by the charging and settlement transaction means by the order receiving means via the first network means; a printing means for printing a holographic stereogram based on the processed image data stored in the image storage device and transmitted via the second network means in accordance with the printout order; and a shipping terminal means for executing a shipping processing of the hologram printed in the printing means.

Further a holographic stereogram print order receiving method of the present invention comprises the steps of: receiving a connection request and an order from a user via a first network means; generating a string of images by executing an image processing relative to a 2-D image which is authenticated and accepted of its order in the order receiving step and transmitted from the user terminal via the first network means by using a parameter information transmitted from the user terminal via the first network, then executes a viewpoint conversion processing relative to the string of the images; storing a processed image data sent via a second network means in an image storage device, the processed image data being obtained by executing the image processing relative to the 2-D image using the parameter information in the image processing step; executing a charging and settlement transaction in response to an order from the user terminal via the first network means; receiving a printout order in accordance with the order received in the order receiving step via the second network means upon completion of the charging and settlement transaction in the charging and settlement step and after recognition thereof by the order receiving step via the first network means; printing a holographic stereogram upon reception of the processed image data stored in the storage device in the image storage processing via the second network means, and read out in accordance with the reception of the printout order in the printout order receiving step; and executing a shipping processing for shipping the holographic stereogram printed out in the printing step.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 6 is a flowchart indicating a zooming image process to be performed in an image processing server;

DETAILED DESCRIPTION OF THE PREFERRED EMBODIMENT

By referring to the accompanying drawings, some preferred embodiments of the present invention are described in detail. These preferred embodiments of the invention pertain to a holographic stereogram print order receiving system capable of receiving an order for printing a holographic stereogram via a network, in which the holographic stereogram is to be produced on the basis of a 2-D picture image that the user already has, and to be applied an image processing thereon using parameter information designated by the user.

Figure 1:
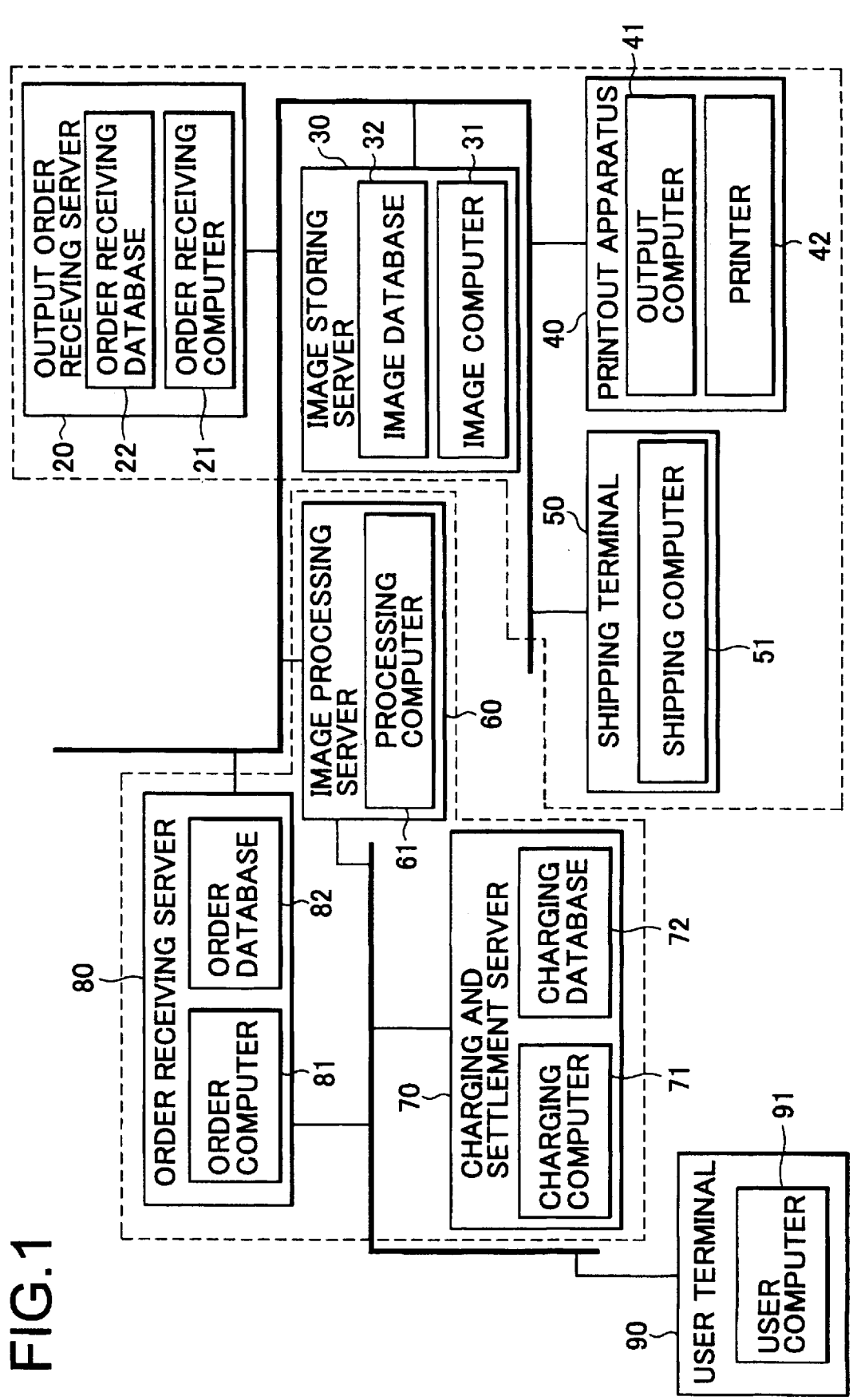
FIG. 1 is a schematic block diagram of a holographic stereogram print order receiving system according to an embodiment of the invention.

A first preferred embodiment of the invention will be described. As shown in FIG. 1, this holographic stereogram print order receiving system is comprised at least of: an order receiving server 80 for receiving an order of a holographic stereogram; an image processing server 60 for performing an image processing such as zoom processing onto a picture image on the basis of a parameter information designating a zooming zone; an image storing server 30 for storing the zooming processed image; a charging and settlement server 70 for executing a charging and settlement transaction with respect to the order of the holographic stereogram; an output order receiving server 20 for receiving a printout order of the holographic stereogram; a printout apparatus 40 for printing the image and providing the holographic stereogram; a shipping terminal 50 for shipping the holographic stereogram; and a user terminal 90 owned by the user.

Among these devices and components described above, the output order receiving server 20, the image storing server 30, the printout apparatus 40 and the shipping terminal 50 in combination constitute a so-called backyard subsystem, while the image processing server 60, the charging and settlement server 70 and the order receiving server 80 in combination constitute a so-called store-front server group which performs communication with the user. Further, a first network connecting the user terminal 90, the image processing server 60, the charging and settlement server 70 and the output order receiving server 80 represents a network such as so-called the Internet to which anyone can access, while a second network connecting the output order receiving server 20, the image storing server 30, the printout apparatus 40, the shipping terminal 50, the image processing server 60 and the order receiving server 80 represents a network such as so-called the Intranet configured locally for the business operator.

Namely, the holographic stereogram print order receiving system of the invention allows for a plurality of user terminals 90 to be connected to the first network connecting the image processing server 60, the charging and settlement server 70 and the order receiving server 80.

In order to permit connection and to receive an order from the user via the user terminal 90, the order receiving server 80 has an order computer section 81 for performing an overall processing at the time of receiving customer orders including a re-order (repeated order) of a particular holographic stereogram and generating various related data, and an order database section 82 for storing various types of information relating to the received holographic stereogram orders as its database.

The order computer section 81 generates various types of information relating to the received orders and indicating contents of these orders including repeated orders, and supplies this information to the order database section 82.

Then, in response to a request of connection from the user terminal 90, the order computer section 81 displays a predetermined initial screen image for use upon an order on a display section (not shown) of the user terminal 90. When such various types of information indicating contents of its order as an order data is supplied from the user terminal 90, the order computer section 81 executes various processing regarding the order on the basis of this order data. More specifically, when a request for an order is sent from the user terminal 90, the order computer section 81 makes inquiry about the user and authentication of its connection. As a result, if the user is eligible, the order computer section 81 causes a predetermined menu screen image for use in placing the order to be displayed on the display section at the user terminal 90, and in response to a selection on this menu screen image by the user via the user terminal 90, confirms the contents of the received order, then requests to the user to send a 2-D image data and a parameter information designating a zooming zone desired by the user in the 2-D image. Then, when the 2-D image data and its parameter information are sent from the user terminal 90, the order computer section 81 transmits these image data and the parameter information to the image processing server 60. Using this parameter information designating the zooming zone desired therein and performing the image processing on the 2-D image data, the image processing server 60 generates a zooming processed image data that is able to form a holographic image in which only the designated zone renders a zooming image when viewed by varying its viewpoint, then sends the same to the user terminal 90 as a preview image data. The user terminal 90, using this preview image data, performs a preview such that the user confirms and verifies the contents of the order on the preview screen image. When a confirmation control signal is supplied from the user, the order computer section 81 confirms the contents of the received order. Subsequently, the same processed image data which is able to form the image in which only the designated zone is zoomed when viewed by changing its viewpoint as the above-mentioned preview image data is sent from the image processing server 60 to the image storing server 30. Then, the order computer section 81 causes a predetermined payment method screen image regarding a charging payment method to be displayed on the display section of the user terminal 90, and then, in response to a user's selection via this payment method screen image at the user terminal 90, the order computer section 81 supplies a charging instruction control signal instructing a payment to the charging and settlement server 70. Further, when a charging complete control signal indicating the completion of charging transaction is supplied from the charging and settlement server 70, the order computer section 81 supplies a receiving order completion control signal indicating the completion of the receiving order to the user terminal 90, and at the same time supplies the received order data indicating the contents of its received order to the output order receiving server 20. The order computer section 81 generates this sort of information of the received order indicating the contents of its order as various types of information relating to the order receiving process, and supplies this information to the order database section 82.

The order database section 82 has a large capacity storage medium such as a hard disc drive or the like and stores various types of information of the order receiving process generated by the order computer section 81 as its database.

The above-mentioned various types of information relating to the order receiving process to be stored in the order database section 82 include, for example, an "order number" designating an identification number unique to each order, a "pass word" for authenticating eligibility of an access right to the image data, a "date and time of the order" indicating the date and time when the order is issued, a "type of output of the order" indicating the output type of the image ordered, a "size of the order", a "quantity of the order" and a "price of the order" indicating the size, the quantity and the price of the order, respectively, a "charging number" designating an identification number unique to each invoice of a bill, a "name of addressee", an "address" indicating an address for a printed matter of the printout image to be delivered and an "image data" indicating a specific image data corresponding to the order number.

The order database section 82 stores a plurality of sets of such information associated and generated corresponding to each of a plurality of orders as its database. These various types of information are read out from the order database section 82 as required by the order computer section 81.

The order receiving server 80 as described above receives an order of a holographic stereogram, and generates an information relating to the order receiving process.

The image processing server 60 has a processing computer section 61 for executing an image processing on the 2-D image transmitted from the user terminal 90, which is authenticated and accepted of its order by the order receiving server 80, by use of the parameter information designating the zooming zone, such that only the designated zone renders a zoomed image when observed by varying its viewpoint.

The processing computer section 61 executes a zooming image processing on the above-mentioned 2-D image. This zooming image processing will be described later in detail. A processed image data generated by the processing computer section 61 by executing the zooming image processing is previewed at the user terminal 90, and is sent to the image storing server 30 after it is confirmed.

The image storing server 30 includes an image computer section 31 which executes an overall control when storing the zooming image processed data and generates various data relating thereto, and an image database section 32 which stores various types of information on the storage of the image data as its database.

When the image computer section 31 receives the image data that is applied the zooming image processing in the image processing server 60 and stores this zooming image processed data to the image database section 32 having a large capacity of storage medium such as a hard disc drive (not shown). Further, the image computer section 31 stores other various image data such as CG (Computer Graphics) data and the like in addition to the above-mentioned zooming image processed data in the image database section 32. Namely, the image computer section 31 enables for the image database section 32 to store even a 3-D (3-Dimentional) image and front view and background view image data in addition to the zooming image processed data. Still further, the image computer section 31 generates various types of information on these image data indicating the contents of its image data corresponding to the zooming image processed data stored or the like, and supplies this information to the image database section 32 to be stored therein. Furthermore, the image computer section 31 reads out a requested zooming image processed data from the image database section 32 in response to the image request control signals supplied from the output order receiving server 20 and the printout apparatus 40, and supplies this zooming image processed data having been read out to the printout apparatus 40.

As described above, the image database section 32 includes a large capacity memory such as a hard disc drive stores, and stores the zooming image processed data under the control of the image computer section 31 as well as the various types of information pertaining to the zooming image processed data generated by the image computer section 31 as its database.

The various data (information) pertaining to the zooming image processed data to be stored in this image database section 32 includes an "image number (order number)" designating an identification number unique to each order, a "password" for authenticating eligibility of the access right to the image data, a "date and hour of registration (of the order)", and an "image data" indicating an image data corresponding to the "image number (order number)".

The image database section 32 stores each information generated corresponding to each of a plurality of zooming image processed data as its database. Various types of information are read out from the image database section 32 by the image computer section 31 when required.

The image storing server 30 as described above stores various image data and also generates various types of information pertaining to these image data.

The charging and settlement server 70 has a charging computer section 71 for executing an overall processing of the charging and settlement transaction in response to the request of order from the user terminal 90 as well as for generating various data associated therewith, and a charging database section 72 for storing the various types of information pertaining to the charging and the payment transaction as its database.

When a charging instruction control signal instructing a charging is supplied from the order receiving server 80, the charging computer section 71 requests to the user terminal 90 a payment information which indicates a payment method necessary for paying a bill. When the charging computer section 71 receives this payment information as a part of the order data from the user terminal 91, the charging computer section 71 is able to execute the charging transaction, then sends a payment completion control signal indicating completion of the payment to the user terminal 90, and at the same time supplies a charging transaction completion control signal indicating that the completion of charging transaction to the order receiving server 80. At the time of processing of the above, the charging computer section 71 generates various types of information pertaining to the charging and settlement processing indicating contents of its charging and settlement transaction to be stored in the charging database section 72 on the basis of the order data.

The charging database section 72 includes a large capacity memory such as a hard disc drive or the like, and stores the various types of information pertaining to the charging and settlement transaction generated by the charging computer section 71 as its database.

The various types of information of the charging and settlement transaction to be stored in this charging database section 72 include a "charging number" designating an identification number unique to each invoice of charging, a "charging date and time" indicating the date and time when the charging procedure is started, a "charging amount (a price of its order)", a "payment method", a "name of financial organization", a "card number and account number", and a "state of payment".

The "charging number" is comprised of an identification number unique to each invoice of charging such as "JPPAY800", "JPPAY801" or the like. The "charging date and time" indicates the date and the time when the charging procedure is started. The "charging amount (charge for the order)" indicates a price of the holographic stereogram being ordered. The "payment method" indicates a payment method for the invoice such as pay-by-transfer account or the like. If the user desires to pay, for example, by a credit card, such information indicating the "credit card" is recorded, and if the user desires to pay by a bank account, such information indicating the "bank account" is recorded. The "name of financial organization" indicates a name of its financial organization corresponding to the payment method. For example, if the user desires to pay by a credit card, the name of its credit card organization is recorded, and if the user desires to pay by a bank account, the name of the bank is recorded. The "card number and account number" indicates its card number corresponding to the payment method designated by the user, and if the user desires to pay by the credit card, the card number of its credit card is recorded, whereas if the user desires to pay by the bank account, a cash card number of the bank is recorded. The "payment status" indicates a present status of its charging transaction such as "pending", "received" or the like.

The charging database section 72 stores the above-mentioned various types of information generated corresponding to a plurality of charging transactions as its database. Various types of information are read out from the charging database section 72 by the charging computer section 71 whenever required.

The charging and settlement server 70 having the above-mentioned arrangement is responsible not only for an overall processing regarding the charging and the payment, but also for generating various types of information associated therewith.

The output order receiving server 20 includes an order receiving computer section 21 for executing an overall processing relating to a holographic stereogram printout order receiving procedure and for generating various data associated therewith, and also with an order receiving database section 22 for storing various types of information regarding the received output orders.

The order receiving computer section 21 generates various types of information relating to the output order receiving process on the basis of the order data supplied from the user terminal 90, and supplies these various types of information to the order receiving database section 22. Further, in order to prepare additional repeated order of the holographic stereogram corresponding to the same order data by the user afterward, the order receiving computer section 21 generates information on the basis of each of the order data, which will be needed when such repeated order for printout of the holographic stereogram is placed, and supplies this information to the order receiving server 80 for use as the repeated order inquiry data at the time of the repeated order. Further, the order receiving computer section 21 generates a print instruction control signal for designating an instructing to print out the holographic stereogram and supplies this print instruction control signal to the printout apparatus 40, and at the same time the order receiving computer section 21 supplies an image request control signal for requesting an image data to be printed to the image storing server 30. Still further, in case of the repeated order, the order receiving computer section 21 receives the repeated order data from the order receiving server 80, generates various types of information on the order receiving operation on the basis of this repeated order data, and supplies this information to the order receiving database section 22.

The order receiving database section 22 has a large capacity memory such as a hard disc drive or the like, and stores various types of information of the order generated by the order receiving computer section 21 as its database.

Various types of information of the order stored in this order receiving database section 22 are such ones that are generated by the output order receiving computer section 21 on the basis of the order data supplied from the user terminal 90.

The above-mentioned various types of information regarding the output order receiving process also include such information that is generated in the order receiving computer section 21 on the basis of the repeated order data supplied from the output order receiving server 80.

The order receiving database section 22 stores such information as described above generated corresponding to each of a plurality of orders as its database. Various types of such information are read from the order receiving database section 22 as required by the order receiving computer section 21.

The output order receiving server 20 having the above-mentioned arrangement executes an overall processing required at the time of receiving the holographic stereogram printout order, and generates various types of information on the output order indicating the contents of its output order.

The printout apparatus 40 includes an output computer section 41 for executing an overall processing required at the time of printing the holographic stereogram and a printer section 42 for outputting a printed matter to the outside in order to print the holographic stereogram appears to be zoomed when viewed by varying its viewpoint after receiving the zooming image processed data stored in the image storing server 30 in response to the output order from the output order receiving server 20.

The output computer section 41 supplies to the image storing server 30 an image request control signal requesting for the zooming image processed data to print, and causes this zooming image processed data to be read out in response to the image request control signal to be printed by the printer section 42. Then, upon completion of the printing, the output computer section 41 supplies a printout completion control signal indicating the completion of the printing of the image to the shipping terminal 50 together with the produced holographic stereogram.

The printer section 42 prints the zooming image under the control of the output computer section 41, and supplies it as a holographic stereogram. This holographic stereogram is supplied to the shipping terminal 50 by the output computer section 41 as described above.

The printout apparatus 40 having the above-mentioned arrangement prints out the zooming image processed data designated so as to produce its holographic stereogram as a final printed matter.

In order to execute the shipping of the holographic stereogram printed by the printout apparatus 40, the shipping terminal 50 is provided with a shipping computer section 51 for executing an overall processing required at the time of shipment of the holographic stereogram.

When a printout completion control signal for indicating the completion of printing of the holographic stereogram is supplied from the printout apparatus 40, the shipping computer section 51 executes various processing to make ready for its shipment. More specifically, in order for each holographic stereogram to be sent to its proper address, the shipping computer section 51 generates various types of information including the address, the addressee, and other related items regarding this holographic stereogram. The holographic stereogram is then shipped upon completion of preparation for shipping by the shipping computer section 51. This shipping or delivery may also be done by request to a transportation agency or by a postal transfer. The shipping computer section 51 generates a shipping information indicating the shipment of the holographic stereogram, records this information, for example, in a hard disc drive or the like, and displays it on the display section.

The shipping terminal 50 constructed as above performs various processing and generates various types of information necessary for shipping holographic stereogram to its proper address of the user.

The user terminal 90 has a user computer section 91 to be used by the user. This user computer section 91 is a possession of the user, and connectable to a network such as the Internet, and may include, for example, a personal computer, a portable mobile telephone, and a portable information terminal such as PDA (Personal Digital Assistants). When an order is placed for the holographic stereogram in which the zooming image based on the parameter information defining the zooming zone can be observed by varying its viewing point, the user computer section 91 requests for connection to the order receiving server 80 via a predetermined internet service provider. If such connection is permitted, the above-mentioned predetermined initial screen image for the order is downloaded from the order receiving server 80 to be displayed on the display section (not shown) at the user terminal 90. Further, when the user places the order request by operating buttons or the like on this initial screen image, the user computer section 91 supplies this order data to the order receiving server 80 in response to the request of the order data described above from the order receiving server 80. As a result, if the order is permitted, a predetermined menu screen image for the order is downloaded from the order receiving server 80 to the user computer section 91 to be displayed on the display section thereof. Further, when the user performs a predetermined operation to state that the user decides on its order, the user computer section 91 supplies an acknowledgment control signal to the order receiving server 80. Then, the user computer section 91 sends a 2-D image as an original image of a holographic stereogram and parameter information designating a zooming zone to the order receiving server 80 in response to the image data request therefrom via the first network. Subsequently, a predetermined payment method selection screen image is downloaded to the user computer section 91 from the order receiving server 80 to be displayed on the display section of the user terminal 90. When the user selects an appropriate payment method by operating the buttons or the like on this payment method screen image, the user computer section 91 supplies a payment method control signal indicating the selected method to the order receiving server 80. Still further, when the user inputs a predetermined payment information in response to the payment information request from the charging and settlement server 70 via an operating section (not shown), the user computer section 91 supplies this payment information as part of the above-mentioned order data to the charging and settlement server 70. Subsequently, a payment completion control signal is supplied to the user computer section 91 from the charging and settlement server 70, and also an order receiving procedure completion control signal is supplied thereto from the order receiving server 80.

The user terminal 90 as described above sends the above-mentioned 2-D image and the above-mentioned parameter information, functions as a user interface at the time of placing the order, and may become a communication terminal capable of exchanging information with the shop operator via the network.

Figure 2:
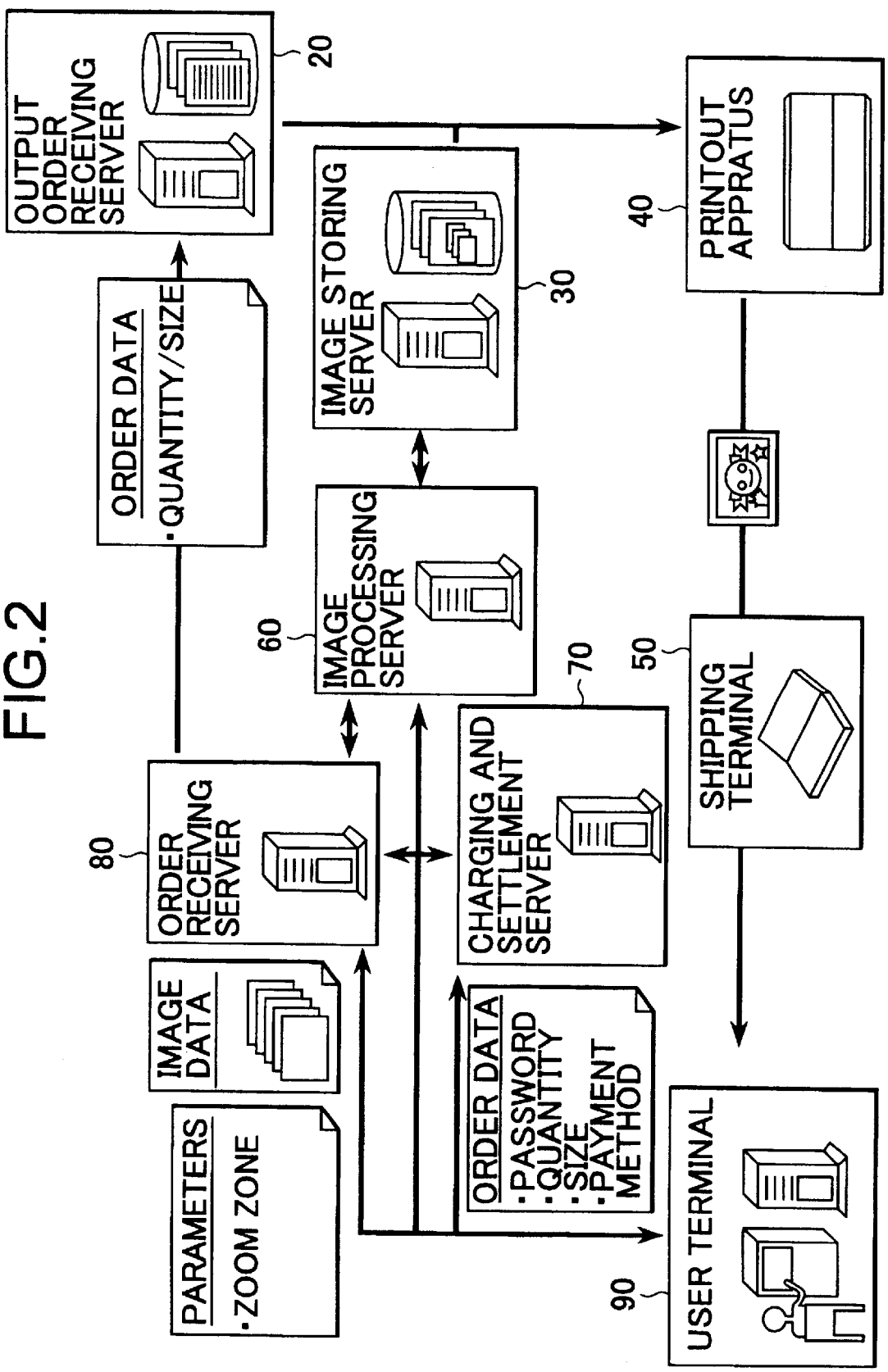
FIG. 2 is a schematic block diagram indicating a flow of information to be exchanged between respective devices in the holographic stereogram print order receiving system shown in FIG. 1.

Now, the holographic stereogram print order receiving system of the invention comprising the above-mentioned respective devices exchanges information between respective devices as shown in FIG. 2 so as to receive a holographic stereogram printout order. By the way, FIG. 2 shows its process of placing the order for a holographic stereogram printout on the basis of the 2-D image and associated parameter information indicating its zooming zone supplied by the user, and its process of information exchange in the shipping process.

In the holographic stereogram print order receiving system of the invention as shown in FIG. 2, its process starts when the user executes to access to the order receiving server 80 via the user terminal 90.

At the beginning, the user requests a connection and a user inquiry to the order receiving server 80 via the user terminal 90. After the inquiry about the user, if the user is determined eligible and its connection is authenticated, the order receiving server 80 proceeds to accept a 2-D image and the associated parameter information indicating the above-mentioned zooming zone to be sent from the user terminal 90, then forward them to the image processing server 60.

The image processing server 60 applies a zooming image processing to the 2-D image on the basis of the parameter information so that a zooming image thereof can be observed when viewed by varying its viewpoint.

The zooming image processed data generated as described above by the image processing server 60 is sent to the user terminal 90 as a preview image data. The user terminal 90 displays a preview screen image on the basis of this preview image data for the user to check and confirm the preview screen image.

Then, the same zooming image processed data the same as the above-mentioned preview image data for producing the zooming image in which only the designated zone appears zooming when viewed by varying its viewing point is sent from the image processing server 60 to the image storing server 30. The image storing server 30 stores the zooming image processed data sent from the image processing server 60.

In response to a request of payment information from the charging and settlement server 70, the user terminal 90 supplies the payment information including the user ID, the quantity, the size and the payment method to the charging and settlement server 70.

The charging and settlement server 70 executes a charging transaction in response to the above-mentioned payment information supplied from the user, and sends a charging transaction completion notice to the order receiving server 80. In response to the above-mentioned payment information and the charging completion notice, the order receiving server 80 generates an order data for use in proceeding with the order corresponding to the charging transaction, and sends the order data to the output order receiving server 20. This order data includes a quantity of prints, a size thereof, an address and the like.

The output order receiving server 20 issues a print instruction to start printing in accordance with the above-mentioned order data to the image storing server 30 and the printout apparatus 40. The image storing server 30 and the printout apparatus 40 operate in accordance with the above-mentioned print instruction for producing a holographic stereogram. Then, this holographic stereogram is delivered to the user via the shipping terminal.

Figure 3:
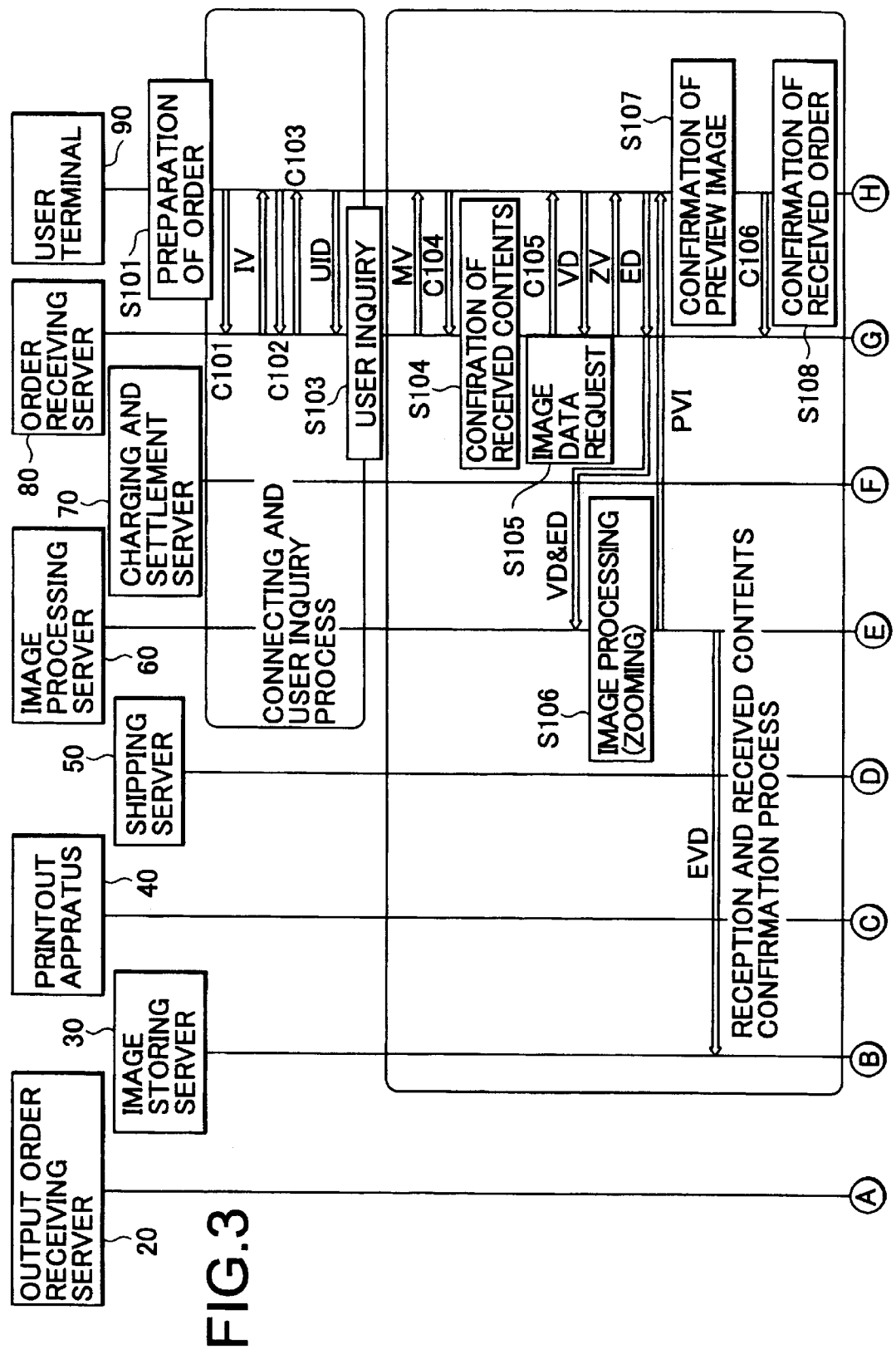
FIG. 3 is a diagram for explaining sequences of process steps in the holographic stereogram print order receiving system embodying the invention, and in particular, it indicates a step of connection and user inquiry, and a step of receiving an output order and confirmation of received contents thereof.
Figure 4:
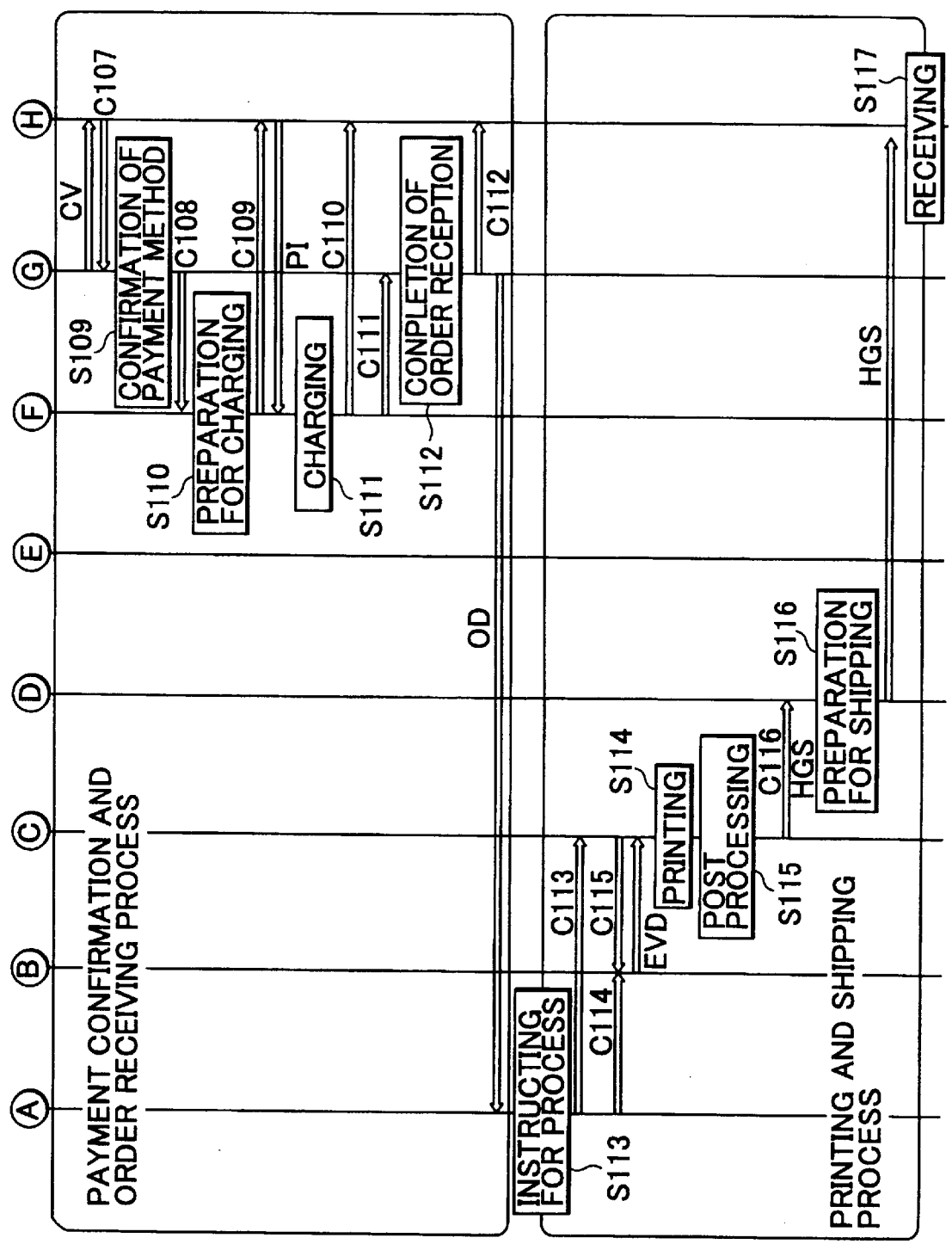
FIG. 4 is a diagram explaining steps of process sequences in the holographic stereogram print order receiving system embodying the invention, and in particular, it indicates steps of payment confirmation, an output order receiving, a printing and shipping process and a receiving process.

More specifically, the holographic stereogram print order receiving system performs a series of processing as shown in FIGS. 3 and 4 in order to receive an order for a printed matter of the holographic stereogram. These series of processing can be grouped roughly into four steps, namely, into a step of the connection and user inquiry, a step of receiving the order and confirming contents of the received order, a step of confirming the charging and receiving the output order, and a step of printing and shipping.

At first, in the holographic stereogram print order receiving system, a step of requesting the connection and user inquiry is performed as shown in FIG. 3. In step S101, the user terminal 90 performs a processing for preparation of an order with respect to the order receiving server 80. For example, this processing for preparation of an order is such processing by the user to attempt to establish communication between the user terminal 90 and the order receiving server 80 via a predetermined internet service provider by starting a so-called browser software for browsing the web sites, inputting a proper URL (Uniform Resource Locator) representing a web site capable of placing a repeated order via an operating section which is not shown. In this system, in accordance with this processing for preparation of an order, a connecting request control signal C101 is supplied from the user terminal 90 to the order receiving server 80. Responsive to this request signal, if its connection is permitted, the predetermined initial screen image IV for use in placing the order described above is downloaded from the order receiving server 80 to the user terminal 90 to be displayed on the display section at the user terminal 90.

Subsequently, in this system, the user requests an order to be accepted by operating a selection button for use in entering the order on the initial screen image IV via the operating section of the user terminal 90. In accordance with this request, an order entry request control signal C102 for requesting entry of the order is supplied from the user terminal 90 to the order receiving server 80. Along with this, in this system, an ID request control signal C103 for requesting a membership identification number of the user is issued from the order receiving server 80 to the user terminal 90 in order to acknowledge if the user is eligible to access to this system. If a proper and correct membership identification number UID is returned from the user terminal 90, the order receiving server 80 then performs the user inquiry (authentication).

The order receiving server 80 makes inquiry about the user whether or not the user is a member (subscriber) who has registered already on the basis of the membership ID number returned. If no membership ID number matches with the returned number or a wrong membership ID number is entered, the user is notified of this error, and is prompted to reenter the correct one or to update the registration. If a reentry does not match or there is no updating of the registration, the connection is cut.

Subsequently, in the holographic stereogram print order receiving system, if the order request is accepted upon authentication of the eligibility of the user, a step of the order reception and confirmation of contents of the order received is performed. In this system, a predetermined menu screen image MV for use in entering an order is downloaded from the order receiving server 80 to the user terminal 90 to be displayed on the display section of the user terminal 90. In this system, the user selects appropriate items relating to his/her order in the menu displayed on the menu screen image MV and operates a selection button for selecting these items via the operating section thereby completing the entry of the order. In this system, in accordance with this selection operation by the user, a selection control signal C104 indicating respective selected items is supplied from the user terminal 90 to the order receiving server 80. Thereby, in the step S104 in this system, contents of the order selected by the user are confirmed in the order receiving server 80.

Subsequently, in this holographic stereogram print order receiving system, a request for a 2-D image data which provides a basic data for generating the holographic stereogram is issued from the order receiving server 80 to the user terminal 90 (step S105) by supplying a request control signal C105 to the user terminal 90.

In response to this request control signal C105, a 2-D image data VD is sent from the user terminal 90 to the order receiving server 80.

Then, the order receiving server 80 downloads a zooming zone designation screen image ZV to the user terminal 90 to be displayed on the display section of the user terminal 90. When the user designates a zooming zone according to the zooming zone designation screen image ZV displayed on the user terminal 90 in a manner as will be described later, a zone designation data ED is sent to the order receiving server 80 as its parameter information. The order receiving server 80 sends the above-mentioned 2-D image data VD and the zone designation data ED to the image processing server 60.

In step S106, the image processing server 60 executes a zooming image processing on the above-mentioned 2-D image data VD using the zone designation data ED. This zooming image processing will be described later. A zooming image processed data EVD generated by execution of the zooming image processing in the processing computer section 61 is sent to the user terminal 90 as a preview image data PVI. At the user terminal 90, a preview display using the above-mentioned preview image data PVI is checked for confirmation (step S107). Then, if a confirmation control signal C106 is supplied from the user, the order receiving computer 81 confirms the contents of the order received in step S108.

Then, the same zooming image processed data EVD as the above-mentioned preview image data for producing a zoomed image in which only the designated zone appears zooming when viewed by varying its viewpoint is sent to the image storing server 30.

In succession, in the holographic stereogram print order receiving system, a step of charging confirmation and output order reception is executed as shown in FIG. 4. In this system, the predetermined payment method indication screen image CV described above is downloaded from the order receiving server 80 to the user terminal 90 to be displayed on the display section of the user terminal 90. Then, when the user selects a desired payment method from the menu displayed on the payment method screen image CV and operates its selection button to select the desired payment method via the operating unit, a payment method control signal C107 is supplied from the user terminal 90 to the order receiving server 80. Then, in step S109, the order receiving server 80 confirms the payment method selected by the user, and a charging instruction control signal C108 for instructing a charging is supplied to the charging and settlement server 70.

Successively, in step S110, the charging and settlement server 70 performs a predetermined preparation processing prior to executing its charging transaction, and issues a payment information request signal C109 to the user terminal 90 requesting for the above-mentioned payment information. In response to this request, the user enters a predetermined payment information via the operating section at the user terminal 90 hence generating a payment information PI to be supplied to the charging and settlement server 70. Upon provision of the payment information PI from the user terminal 90, the charging and settlement server 70 executes its charging processing in step S111.

Then, in this system, a payment complete control signal C110 indicating that the payment has been completed is supplied from the charging and settlement server 70 to the user terminal 90, and at the same time, a charging transaction complete control signal C111 indicating the completion all charging transaction is supplied from the charging and settlement server 70 to the order receiving server 80. Further, in step S112, the order receiving server 80 executes a processing to complete the order receiving service, and supplies an order receiving completion control signal C112 indicating the completion of the order receiving service to the user terminal 90. At the same time, the order receiving server 80 supplies to the output order receiving server 20 a received order data ROD which is based on the above-mentioned payment information PI.

Subsequently, a step of printing and delivery procedures is executed in the holographic stereogram print order receiving system. At first in step S113, a print instruction control signal C113 instructing to print the image is generated by the output order receiving server 20 and is sent to the printout apparatus 40. Further, in this system, image request control signals C114 and C115 requesting for the image data to print are sent from the output order receiving server 20 and the printout apparatus 40 to the image storing server 30. Accordingly, the zooming image processed data EVD to be printed in response to the image request control signals C114 and C115 is read out from the image storing server 30 and is supplied to the printout apparatus 40.

Successively, in this system, a printout processing for printing the zooming image processed data EVD is executed in the printout apparatus 40 in step S114, and further a post-print processing is performed if necessary in step S115. This post-print processing may include, for example, a predetermined heat treatment of the holographic stereogram, and also processing such as to cut a printed matter into a predetermined size, pasting the printed matter on a predetermined mount, and so on.

Then, in this system, together with the produced holographic stereogram HGS, a printout completion control signal C116 indicating completion of the printing is supplied from the printout apparatus 40 to the shipping terminal 50. In step S116, a predetermined shipping processing is executed by the shipping terminal 50 to deliver the holographic stereogram HGS to the user. In step S117, the user receives the delivered holographic stereogram HGS, then the series of these processing are completed.

Figure 5:
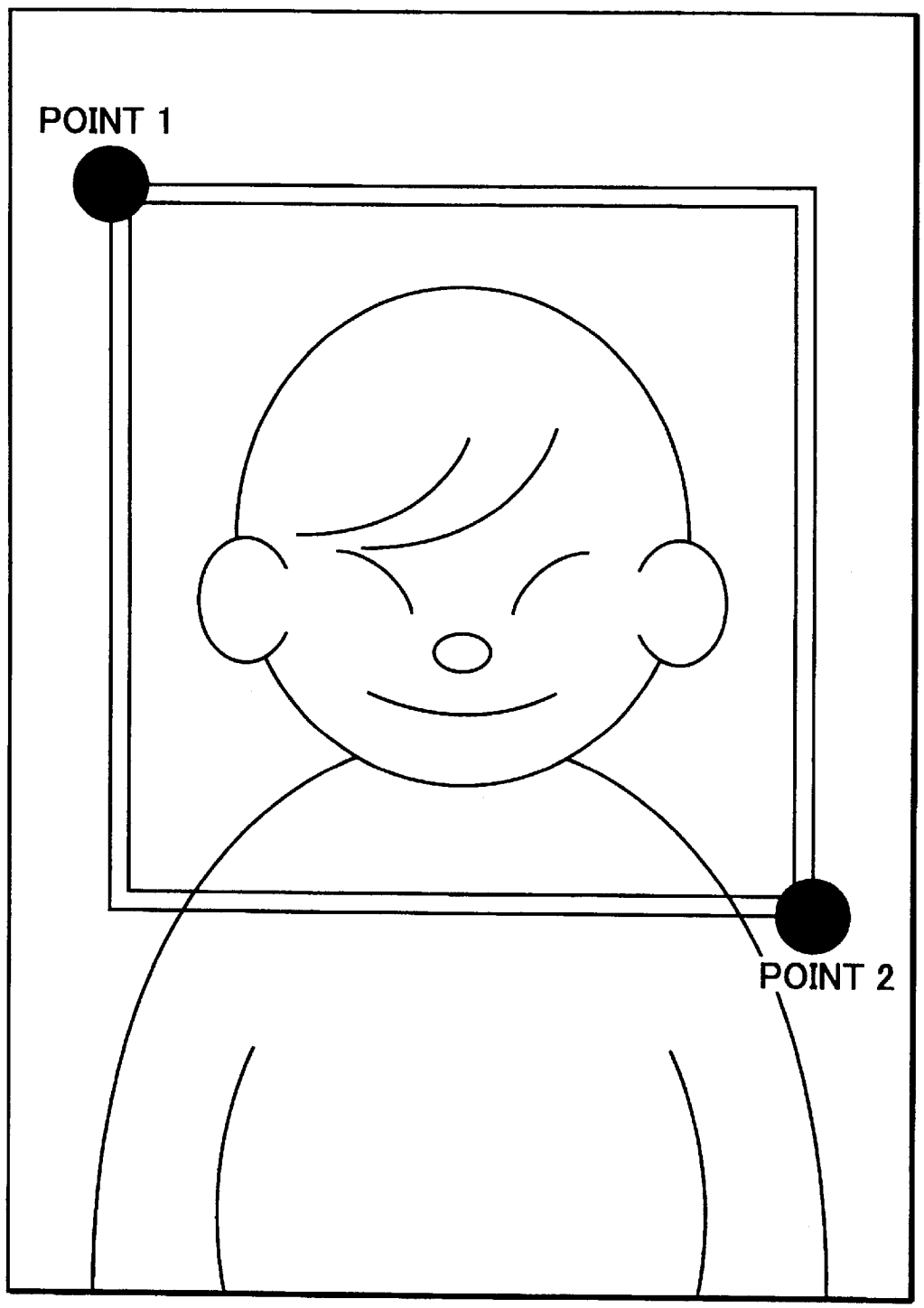
FIG. 5 is a diagram indicating a zooming zone designation process to designate a zooming zone in a 2-D image.

Now, the process for designating the zooming zone on the 2-D image in accordance with the zooming zone designation screen image displayed on the user terminal 90 by the user will be described with reference to FIG. 5. The designation of the zooming zone can be done by selecting two proper points 1 and 2 on diagonal corners of an area where the user desires to be zoomed as shown in FIG. 5.

The zooming image processing performed by the image processing server 60 will be described in the following. This processing is done using the 2-D image data VD such that the specific zone designated by the zone designation data ED is zoomed gradually. FIG. 6 shows the process flowchart thereof. In the beginning, in step S121, the image processing server 60 cuts out the zooming zone designated by the zone designation data ED from the 2-D image data VD. Then, in step S122, the image processing server 60 generates a string of a plurality of images that constitute elements of the zooming image. Then, in step S123, by performing the viewpoint conversion processing on the string of these plurality of images for use in a re-centering camera on the basis of a time spatial parameter, a string of images for use in generating a holographic stereogram is produced. By entering this string of the images for use in generating a holographic stereogram into the printout device via the image storing server 30, the holographic stereogram in which the image is zoomed gradually when viewed by varying its viewpoint is produced in step S124.

The above-mentioned viewpoint conversion processing to be executed in the image processing server 10 will be described in the following. The string of these images generated by applying the above-mentioned various image processing in the image processing server 10 needs to be applied with the viewpoint conversion processing.

Figure 7A:
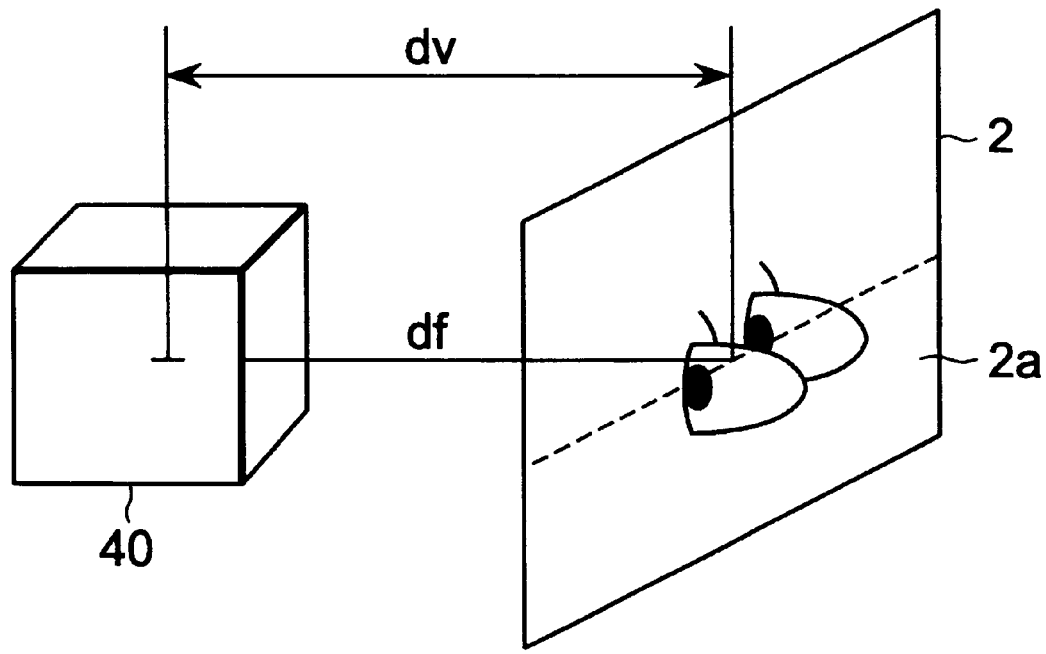
FIG. 7 is a diagram indicating a viewing point conversion processing to be performed on each element of a parallax image string.

By the way, in a holographic stereogram, there occurs such a phenomenon that, as shown in FIG. 7A, a reproduced image 40 of a hologram recorded image becomes gradually distorted as the viewing point moves farther from a hologram surface 2a. Further, with regard to the white light reproduced holographic stereogram 2, a blur of the image substantially decreases the closer the reproduced image 40 is constantly located to the hologram surface 2a. The above-mentioned phenomenon of the distortion is caused due to a fact that a positional relation between an image shooting point of a camera for shooting the parallax image string and the object P, namely, a shooting distance df, is maintained also with regard to the reproduced image 40 reproduced from the holographic stereogram 2 which is produced by the holographic stereogram producing apparatus, thereby resulting in the deviation due to a difference between the viewing point and the image shooting point.

Namely, in the holographic stereogram, if a parallax image string data based on the parallax image string is supplied directly as they are, without applying the viewpoint conversion processing described later, as a light exposure image data to the printing unit so as to generate a light exposure image, and if a hologram record image is produced by exposure and recording on a hologram recording medium in accordance with this light exposure image, its reproduced image 40 appears to be focused at a point deviated deeper by the shooting distance df relative to the hologram surface 2a as shown in FIG. 7A. Therefore, for the holographic stereogram 2, it is necessary in order to obtain a good reproduced image 40 in an excellent state without any distortion and/or blur that it must be used in such a condition with the eyes of the user positioned on the hologram surface 2a as shown in FIG. 7A so that its viewing distance dV coincides with the shooting distance df of the parallax image string. However, this is not practical.

When performing the image data processing on the parallax image string information based on the parallax image string in the image processing server 60, the viewing point conversion processing is performed such that its reproduced image 40 is positioned constantly in the vicinity of the hologram surface 2a of the holographic stereogram 2, and then its light exposure image data is produced. As to the holographic stereogram 2, its hologram recording image is exposed and recorded on the hologram recording medium with an object laser beam and a reference laser beam, being modulated by the light exposure image displayed on a liquid crystal display in accordance with the light exposure image data subjected to the viewing point conversion processing described above.

Figure 7B:
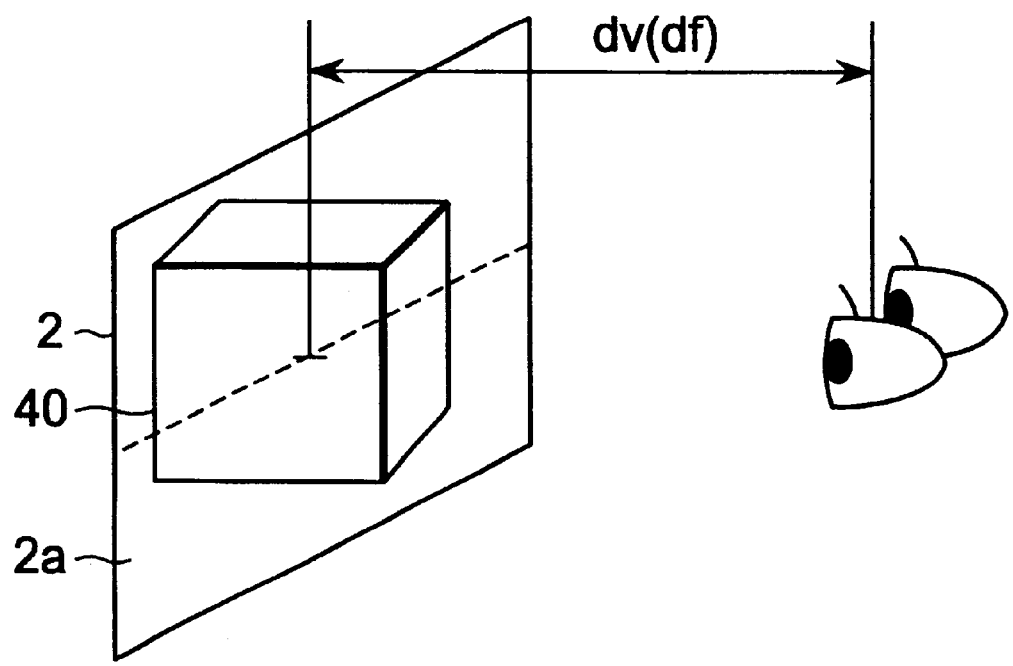

Thereby, in this holographic stereogram 2, as shown in FIG. 7B, its reproduced image 40 is constantly positioned in the vicinity of the hologram surface 2a. Therefore, a clearly reproduced image 40 free from a distortion and blurring can be generated without requiring for the user to observe the image with his/her eyes positioned on the hologram plane 2a as described above.

Figure 8:
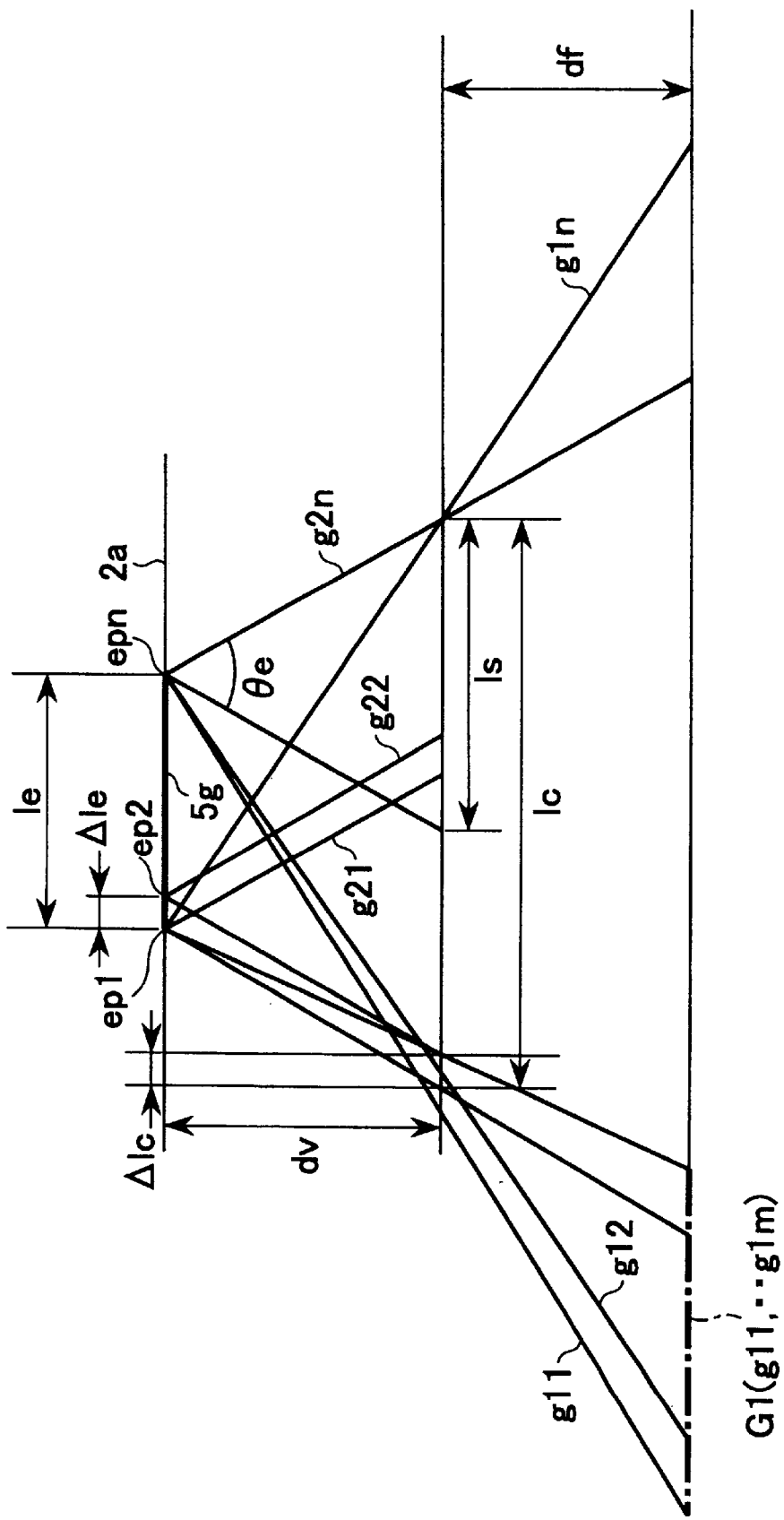
FIG. 8 is a diagram indicating more specifically the details of the viewing point conversion processing.

FIG. 8 is a diagram for explaining a principle of the viewing point conversion processing for reconstructing a light exposure image data D2 from a parallax image string data D1 based on a parallax image string G1 including a series of m pieces of element parallax images g1 (g11, g12, ... g1m) which are produced by a re-centering shooting method. The light exposure image data D2 generates a light exposure image G2 including a series of n pieces of element light exposure images g2 (g21, g22, ... G2n) to be displayed on the liquid crystal display. The holographic stereogram printing system which is provided with the image data processing computer displays the element light exposure images g2 based on the light exposure image data subjected to the viewing point conversion processing sequentially on the liquid crystal display so that an element hologram recording image 5g be recorded on the hologram recording medium.

FIG. 8 is further a diagram for explaining a positional relationship between each element light exposure image g2 in the light exposure images G2 for exposing/recording each element hologram recording image 5g at each light exposure point ep (ep1, ... , epn) on the hologram surface 2a of the holographic stereogram 2 having a length le in a parallax direction (horizontal direction) and each element parallax image g1 of parallax image string G1. At each light exposure point ep, the element light exposure image g2 is exposed at a viewing distance dv and an exposure angle of θe. For simplicity of explanation, each of the above-mentioned light exposure points ep is indicated only at ep1, ep2 and epn. Depending on its lateral size (length in the horizontal direction) 1e of the holographic stereogram 2 and a specified display resolution of the hologram recording image 5, the number of these light exposure points ep must be varied, however, it is assumed here that the number n be approximately 500 with an equi-pitch of 0.2 mm.

A pitch Δle of each light exposure point ep is identical to a pitch of each element light exposure image g2, and there holds the following equation;

$$le = n \times \Delta le \quad (1)$$

Further in FIG. 8, a distance 1c is a shooting width at shooting the parallax image string G1 including element parallax images g1 to the number of m, a distance dv is a viewing distance, and a shooting distance df is a distance for shooting the parallax image string G1. By the way, the pitch Δle of each light exposure point ep and a shooting width Δlc of each element parallax image g1 are not always equal to each other. The viewing distance dv and the shooting distance df are equal. At each light exposure point ep on the holographic stereogram 2, there is exposed and recorded each element light exposure image g2 which is displayed sequentially on the liquid crystal display 24 at an exposure angle θe. Each element light exposure image g2 has an image size corresponding to its resolution, for example, 640 pixels in a vertical direction and 480 pixels in a horizontal direction.

The viewing point conversion processing is an image data processing for reconstructing a new light exposure image data D2 so as to generate the element light exposure images g2 to the number of n by interchanging the element parallax image data d1 to the number of m in the parallax image string G1. In the viewing point conversion processing, the interchange of the element parallax image data d1 is performed by a minimum unit of the element image in a slit form with 640 pixels in the vertical direction and 1 pixel in the horizontal direction. This element image data is taken out from the element parallax image data d1 to the number of m so as to construct the element light exposure image g2 with an image size of 640 pixels in the vertical direction and 480 pixels in the horizontal (parallax) direction.

The printer section (holographic stereogram printer device) 42 in the printout apparatus 40 for generating the holographic stereogram in step S124 will be described with reference to FIGS. 9A and 9B.

Figures 9A, 9B:
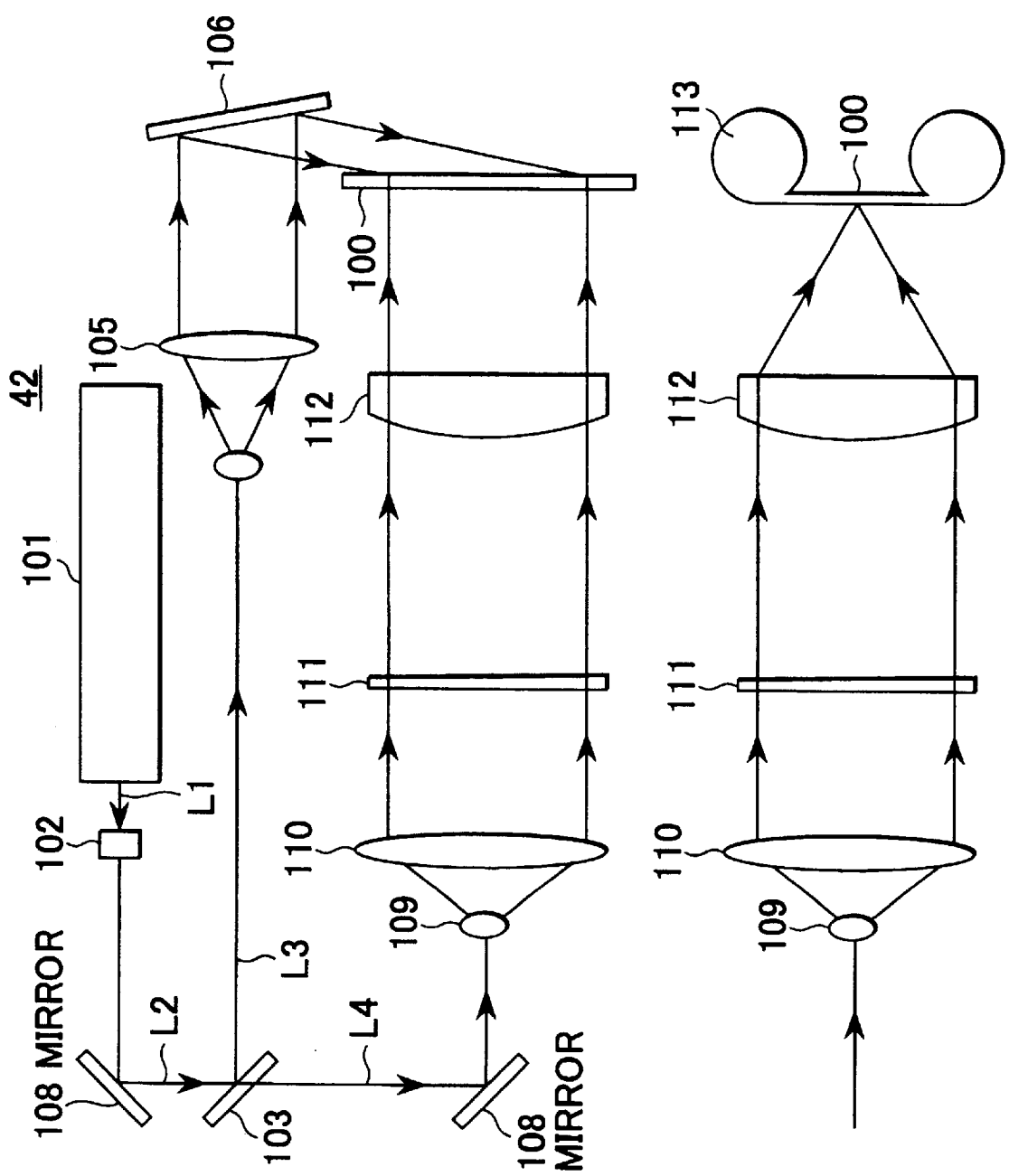
FIG. 9 is a diagram indicating an optical system of a holographic stereogram printer in the printout apparatus.

FIG. 9A is a plan view of a whole portion of an optical system of the printer section 42, while FIG. 9B is a side view of the optical system of the printer section 42 indicating only a portion of its object light path.

The printer section 42, as shown in FIG. 9A, is comprised of a laser beam source 101 for emitting a laser beam having a predetermined wavelength, a light exposure shutter 102 disposed on an optical axis of a laser beam L1 emitted from the laser source 101, and a half mirror 103 disposed likewise.

The light exposure shutter 102 which is controlled by the output computer portion is closed when a hologram recording medium 100 is not exposed, and is opened when the hologram recording medium 100 is exposed. The half mirror 103 is provided for splitting a laser beam L2 passed the light exposure shutter 102 into a reference beam and an object beam, wherein a beam L3 which is reflected on the half mirror 103 becomes the reference beam and a beam L4 which transmits through the half mirror 103 becomes the object beam.

Along an optical axis of the beam L3 reflected on the half mirror 103, there are disposed as an optical system for the reference beam a cylindrical lens 104, a collimator lens 105 for collimating the reference beam and a full reflection mirror 106 sequentially in this order of description.

Then, the beam of light reflected on the half mirror 103 is diverged by the cylindrical lens 104, collimated by the collimator lens 105, then reflected on the full reflection mirror 106 so as to impinge on the hologram recording medium 100.

On the other hand, on an optical axis of a beam L4 which is transmitted through the half mirror 103, there are disposed as an optical system for the object beam a full reflection mirror 108 for reflecting the transmitted beam from the half mirror 103, a spatial filter 109 which combines a convex lens and a pin hole, a collimator lens 110 for collimating the object beam, a display device 111 which displays an image of the object to be recorded, and a cylindrical lens 112 for converging the object beam on the hologram recording medium 100 in this order of description.

Then, the beam L4 transmitted through the half mirror 103 and after reflected on the full reflection mirror 108 is turned from the spot beam from the spot beam source into a diffused light by the spatial filter 109, then collimated by the collimator lens 110, and then enters into the display device 111. Here, the display device 111 which is, for example, a transmission type image display device such as a liquid crystal panel, displays an image thereon in accordance with a processed image data sent from the image processing server 60 via the image storing server 30. Then a light having transmitted the display device 111 after modulated in accordance with the image displayed on the display device 111 enters into the cylindrical lens 112.

Then, the light having transmitted through the display device 111 is converged in a horizontal direction by the cylindrical lens 112, and this converged light enters into the hologram recording medium 100 as the object beam. Namely, in this printer portion, a projection light from the display device 111 enters the hologram recording medium 100 as the object light of incidence in the form of strips.

Here, it is arranged such that the reference beam enters into one main surface of the hologram recording medium 100 while the object beam enters into the other main surface of the hologram recording medium 100. Namely, the reference beam is caused to enter the one of the main surfaces of the hologram recording medium 100 at a predetermined angle of incidence while the object beam is caused to enter the other side of the main surfaces of the hologram recording medium 100 with an optical axis of the object beam aligned substantially perpendicular relative to the hologram recording medium 100. Thereby, the reference beam and the object beam are arranged to interfere with each other on the hologram recording medium 100 thereby generating interference fringes due to this interference, and this interference fringes are recorded on the hologram recording medium 100 as a change in the index of refraction.

Further, this printout portion is provided with a recording medium feed mechanism 113 which under the control of the output computer portion can feed intermittently the hologram recording medium 100. Every time when an image based on the zooming processed data generated in the image processing server 60 is recorded as one hologram element (element hologram) on the hologram recording medium 100, this recording medium feed mechanism 113 feeds intermittently by one hologram element portion, the hologram recording medium 100 which is set in a predetermined state on the recording medium feed mechanism 113 in response to a control signal from the output computer portion. Thereby, the above-mentioned image based on the zooming processed data is sequentially and consecutively recorded as the hologram element on the hologram recording medium 100 in the horizontal direction.

In the printer portion, it is desirable that the length of the optical path of the reference light reflected by the half mirror 103 and entering into the hologram recording medium 100 be substantially equal to that of the object light transmitted through the half mirror 103 and entering into the hologram recording medium 100 via the display device 111. This improves interference between the reference light and the object light and hence the image quality of the holographic stereogram.

Further, in the printer portion, a diffusion plate may be provided on the light path of the object light for improving the image quality of the holographic stereogram. By provision of such diffusion plate, a noise component contained in the object light is scattered to assure uniform light intensity distribution of the object light incident on the hologram recording medium 100 for improving the image quality of the produced holographic stereogram.

However, when arranging the diffusion plate in this manner, a mask having a strip-shaped opening therein corresponding to the shape of the hologram element is preferably arranged between the diffusion plate and the hologram recording medium 100. By arranging such mask, a superfluous portion of the object light diffused by the diffusion plate is masked by the mask thus enabling a holographic stereogram of higher image quality to be produced.

For assuring a viewing angle in the vertical direction for the holographic stereogram in the printer portion, a one-dimensional diffusion plate for diffusing the object light in the vertical direction may be provided on the light path of the object light. By arranging this one-dimensional diffusion plate, the object light may be diffused in the vertical direction, that is, in the major axis direction of the produced hologram element. Thus the holographic stereogram produced has a viewing angle in the vertical direction.

However, if such a one-dimensional diffusion plate is arranged in this manner, a louver film having a fine lattice in the form of a bamboo blind is desirably arrayed between the hologram recording medium 100 and the one-dimensional diffusion plate. By arranging the louver film in this manner, the reference light transmitted through the hologram recording medium 100 can be prevented from being reflected by the one-dimensional diffusion plate to re-enter the hologram recording medium 100.

As described hereinabove, the holographic stereogram print order receiving system embodying the invention is capable of receiving the 2-D image the user already has and the parameters designating the zooming zone the user desires via the network, applying the zooming image processing to the 2-D image accordingly, and generating the holographic stereogram to be provided to the user using the zooming image processed data. Therefore, there are such advantages and benefits both to the user and the shop operator that the user can place the order via the internet for the holographic stereogram in which the designated specific zone of the image the user desires is zoomed using the 2-D image the user already has therefore without the need for the user to take further 2-D pictures, and that the rate of operation (availability factor) of the holographic stereogram printing system can be substantially improved to the benefit of the shop operator.

Although the invention has been described in its preferred from with a certain degree of particularity, obviously many changes, variations and combinations are possible herein. It is therefore to be understood that any modifications will be practiced otherwise than as specifically described herein without departing from the scope of the present invention.

What is claimed is:

1. A hologram print order receiving system, comprising:
   user terminal means;
   first network means to which said user terminal means is connected;
   order receiving means for receiving a connection request and an order from said user terminal means via said first network means;
   image processing means for executing image processing relative to an image transmitted from said user terminal means via said first network means when said order is authenticated and accepted in said order receiving means;
   second network means connected to said first network means via said order receiving means and said image processing means;
   image storage means for storing processed image data obtained by executing said image processing relative to said image transmitted via said second network means;
   charging and settlement transaction means for performing a charging and settlement transaction in accordance with said order from said user terminal means;
   printout order receiving means for receiving a printout order corresponding to said order received by said order receiving means via said second network means after completion of said charging and said settlement transaction by said charging and settlement transaction means by said order receiving means via said first network means;
   printing means for printing a hologram based on said processed image data stored in said image storage means and transmitted via said second network means in accordance with said printout order; and
   shipping terminal means for executing a shipping processing of said hologram printed in said printing means.

2. The hologram print order receiving system according to claim 1, wherein
   said image processing means generates zooming image data for forming a zooming image in a designated area of said image when viewed by varying its viewpoint, said zooming image data generated by executing said image processing relative to said image received from said user terminal via said first network.

3. The hologram print order receiving system according to claim 2, wherein
   said printing means receives said zooming image data obtained by executing said image processing relative to said image such that the designated area of said image is zoomed and stored in said storage means in accordance with said printout order of said received order from said printout order receiving means, and prints said hologram.

4. The hologram print order receiving system according to claim 1, wherein said user terminal means generates payment information designating a payment method and supplies said payment information to said charging and settlement transaction means; and
   said charging and settlement transaction means executes said charging and settlement transaction for said ordered hologram based on said payment information.

5. The hologram print order receiving system according to claim 4, wherein said charging and settlement transaction means generates charging and settlement transaction information describing contents of said charging transaction according to said payment information and stores said charging and settlement transaction information generated corresponding to a plurality of charging transactions in a database.

6. The hologram print order receiving system according to claim 5, wherein
   said order receiving means supplies a received order data describing the contents of said received order to said printout order receiving means via said second network upon completion of said charging transaction by said charging and settlement transaction means and generates information regarding a reception of the order.

7. A holographic stereogram print order receiving method, comprising the steps of:
   receiving a connection request and an order from a user via a first network means;
   generating a string of images by executing image processing relative to a two-dimensional image authenticated and accepted of its order in said order receiving step and transmitted from said user terminal via said first network means by using parameter information transmitted from said user terminal via said first network and executing a viewpoint conversion processing relative to said string of images;

storing processed image data sent via second network means in image storage means, said processed image data being obtained by executing said image processing relative to said two-dimensional image using said parameter information in said image processing step;

executing a charging and settlement transaction in response to an order from said user terminal via said first network means;

receiving a printout order in accordance with said order received in said order receiving step via said second network means upon completion of said charging and settlement transaction in said charging and settlement step and after recognition of said order by said order receiving step via said first network means;

printing a holographic stereogram upon reception of said processed image data stored in the storage means in said image storage processing via said second network means and read in accordance with a reception of said printout order in said printout order receiving step; and executing a shipping processing for shipping said holographic stereogram printed out in said printing step.

8. The holographic stereogram print order receiving method according to claim 7, wherein said image processing step comprises the step of generating a zooming image data by executing said image processing relative to said two-dimensional image received from said user terminal via said first network means based on said parameter data designating a zooming zone in said two-dimensional image such that a designated zone of said image is zoomed when viewed by varying a viewpoint.

9. The holographic stereogram print order receiving method according to claim 8, wherein said printing step comprises the step of printing said holographic stereogram from said zooming image data of said two-dimensional image in response to said reception of said printout order of said received order in said output order receiving step.

10. The holographic stereogram print order receiving method according to claim 7, wherein said user terminal generates payment information indicating a payment method for a payment and supplies said payment information to said charging and settlement transaction step via said first network to allow for said charging and settlement transaction step to execute said charging and settlement transaction for said holographic stereogram ordered based on said payment information.

11. The holographic stereogram print order receiving method according to claim 10, wherein said charging and settlement transaction step generates charging and settlement transaction information describing contents of said charging transaction and stores said charging and settlement transaction information generated for each of a plurality of charging transaction in a database.

12. The holographic stereogram print order receiving method according to claim 10, wherein said order receiving step supplies said received order data indicating contents of said received order to said printout order receiving step for said received order via said second network upon completion of said charging transaction in said charging and settlement transaction step and generates information regarding said order receiving step.

13. The hologram print order receiving system according to claim 1, wherein said hologram is a holographic stereogram and said image is a two-dimensional image.

14. The hologram print order receiving system according to claim 13, wherein said image processing relative to said two-dimensional image is executed in accordance with parameter information transmitted from said user terminal via said first network to generate a string of images and to execute viewpoint conversion processing relative to each of said string of images.

15. An apparatus for executing print order receiving and delivering of a hologram, comprising:

user terminal means;

first network means to which said user terminal means is connected;

order receiving means for receiving an order from said user terminal means via said first network means;

second network means connected to said first network means via said order receiving means;

image storage means for storing image data transmitted from said user terminal means via said network means;

charging and settlement transaction means for performing a charging and settlement transaction in accordance with said order from said user terminal means;

printout order receiving means for receiving a printout order corresponding to said order received by said order receiving means via said second network means after completion of said charging and said settlement transaction by said charging and settlement transaction means by said order receiving means via said first network means;

printing means for printing said hologram based on said image data stored in said image storage means and transmitted via said network means in accordance with said printout order; and shipping terminal means for executing shipping processing of said hologram printed in said printing means.

* * * * *